(No Model.)

S. L. BRAY.
COMBINED JUG HANDLE AND STOPPER.

No. 418,940. Patented Jan. 7, 1890.

WITNESSES:
Fred G. Dieterich
Edw. W. Byrn

INVENTOR:
S. L. Bray
BY Munn & Co.
ATTORNEYS

UNITED STATES PATENT OFFICE.

SIMEON L. BRAY, OF EVANSVILLE, INDIANA, ASSIGNOR OF ONE-HALF TO BARBARE GUGENHEIM, OF SAME PLACE.

COMBINED JUG HANDLE AND STOPPER.

SPECIFICATION forming part of Letters Patent No. 418,940, dated January 7, 1890.

Application filed October 7, 1889. Serial No. 326,160½. (No model.)

*To all whom it may concern:*

Be it known that I, SIMEON L. BRAY, of Evansville, in the county of Vanderburg and State of Indiana, have invented a new and useful Improvement in a Combined Jug Handle and Stopper, of which the following is a specification.

My invention is in the nature of a combined handle and stopper for a jug; and it consists in the peculiar construction and arrangement of a bail connected to the jug so as to form a handle and provided with a stopper adapted to close the mouth of the jug by the turning of the bail-handle, as hereinafter fully described.

Figure 1:
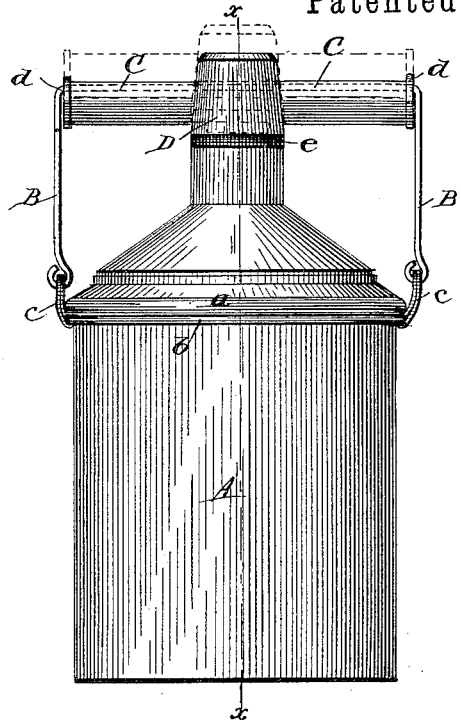
Figure 2:
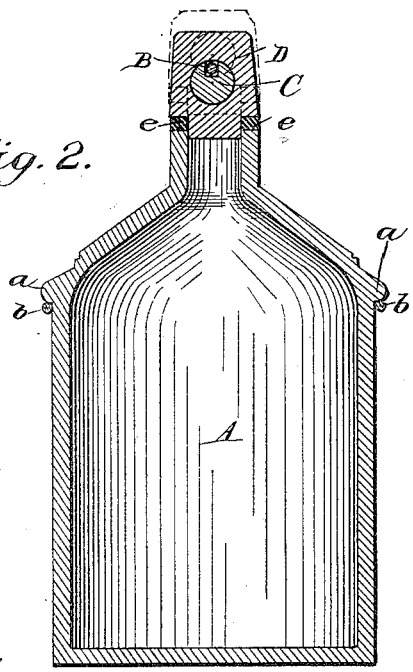

Figure 1 is a side elevation, and Fig. 2 a vertical section through line $x$ $x$.

A represents the jug, which is formed without the usual handle, but has at its shoulder (where the jug begins to taper to the mouth) a bead or flange $a$. Just below this bead is tightly secured a belt or girdle $b$, of wire or band-iron, having at diametrically-opposite sides two ears or clips $c$ $c$. Into these ears are fastened the ends of a wire bail B. The horizontal portion of this bail is provided with a round wooden handle C, the bail-wire being arranged eccentrically in a longitudinal groove of the handle and is retained therein by a ferrule, thimble, or sleeve $d$ at each end.

D is the stopper, which is made of wood or other material and has a soft-rubber gasket $e$ at its lower edge to make a tight fit with the mouth of the jug. Through this stopper is formed transversely a round hole of the same size as the handle, which passes loosely through the same, so that it can be turned axially. With this construction it will be seen that when the handle is turned so as to bring the bail-wire on the upper side of the same the handle acts like a cam or eccentric to force the stopper tightly down to close the mouth of the jug, and when the handle is turned so as to be above the bail the stopper is raised from the mouth of the jug. The advantages of this construction are that the stopper is never out of place, but always conveniently at hand, and need not be laid down where it is liable to get dirty or become lost. Furthermore, the handle constitutes a very convenient hand-hold for one or two persons to support the jug by in handling or transporting the same, as said handle extends out to the sides of the jug.

Having thus described my invention, what I claim as new is—

1. The combination, with a jug, of a stopper having a transverse hole through it, a handle passing through said stopper and extending to the sides of the jug, and a bail connected to the jug at its ends and arranged eccentrically in the handle, substantially as shown and described.

2. The combination, with a jug, of a stopper having a transverse hole through the same, a handle having a longitudinal groove in its surface and extending through the stopper, a bail having its horizontal portion in said groove, sleeves or thimbles at the ends of the handle for securing the bail thereto, and a belt or girdle for connecting the bail to the jug, substantially as shown and described.

SIMEON L. BRAY.

Witnesses:
WILLIAM E. COLE,
WILLIAM M. BLAKEY.